Sept. 8, 1942.  G. B. BROWN ET AL  2,295,155
METHOD OF MAKING SOUND ABSORBING MATERIAL
Original Filed July 14, 1939
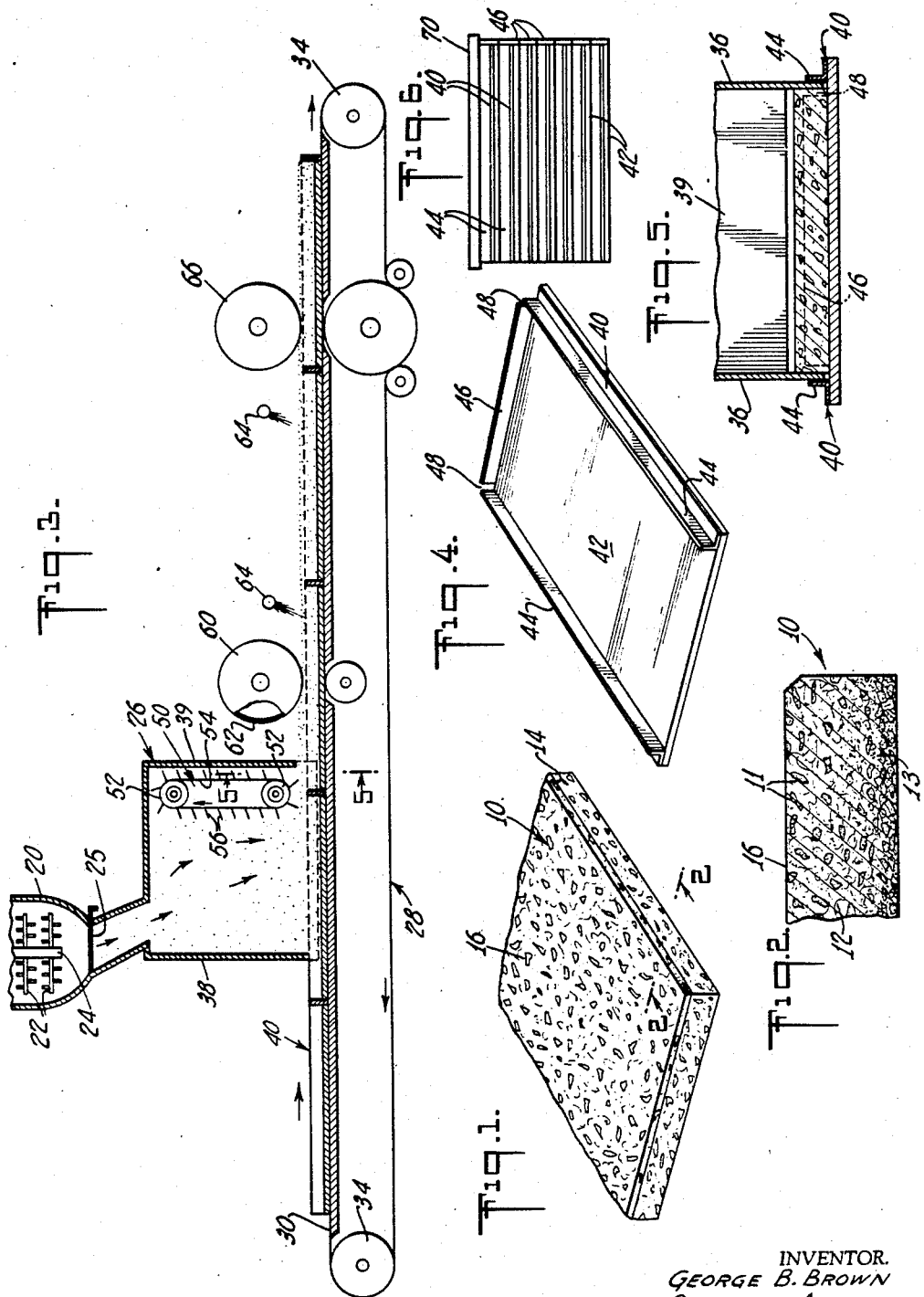
INVENTOR.
GEORGE B. BROWN
OSBORN AYERS.
BY Virgil C. Kline
ATTORNEY Patented Sept. 8, 1942

2,295,155

UNITED STATES PATENT OFFICE 2,295,155

METHOD OF MAKING SOUND ABSORBING MATERIAL

George B. Brown, Martinsville, and Osborn Ayers, Plainfield, N. J., assignors to Johns-Manville Corporation, New York, N. Y., a corporation of New York Original application July 14, 1939, Serial No. 284,390. Divided and this application November 12, 1941, Serial No. 418,720

7 Claims. (Cl. 25—155)

The present invention relates to acoustical material, and particularly to a method of making monolithic sound-absorbing blocks or sheets, the instant application being a division of our application Serial No. 234,390, filed July 14, 1939, covering the product.

Acoustical treatments for application to the ceilings and walls of rooms and the like are at present in wide commercial use. Such treatments conventionally comprise sound-absorbing media applied as a finishing or covering layer to the ceiling or room walls. Heretofore, however, there has not been obtained a low cost acoustical treatment in which is combined high sound-absorption efficiency with the appearance and ease of application of monolithic panels or blocks.

A principal object of the present invention is the provision of a method of making a monolithic acoustical block adapted for ready application to a ceiling or wall by means of adhesives or suitable suspension means and which exhibits a high sound-absorbing efficiency.

A further object of the invention is the provision of a method of making a panel or a block, as referred to above, which is relatively inexpensive as compared to sound-absorbing structures heretofore employed for like uses.

A still further object of the invention is the provision of a method of making a sound-absorbing monolithic panel or block which is fire-resistant, is not subject to warping or expansion when exposed to high humidities, can be painted without detracting from its acoustical properties, and which is of sufficient strength to readily withstand the handling necessary in its transportation and application.

Briefly stated, our method produces a monolithic product comprising porous sound-absorbing particles, particularly ground natural sponge, asbestos reinforcing fibre, and a binder of the type of Portland cement. Such product is relatively low in cost, of the desired porosity, has a high sound-absorbing efficiency, and otherwise meets the several desiderata set forth in the statements of object above.

The method includes dry mixing the several ingredients and depositing the mixture on flanged mold boards to a depth slightly greater than the height of the flanges. After wetting with a sufficient amount of moisture to hydrate the cementitious binder, the material is slightly pressed and the mold boards are then stacked to permit the cementitious material to air cure and to compress the mixture by the weight of the superposed boards to a finished thickness determined by the flanges. After the air curing, the slabs are preferably dried at elevated temperatures.

Our invention will be more fully understood and further objects and advantages thereof will become apparent when reference is made to the more detailed description thereof which is to follow and to the accompanying drawing, in which:

Fig. 1 is a fragmentary perspective view of an acoustical panel or block formed in accordance with the invention;

Fig. 2 is a detail sectional view on an enlarged scale taken on the line 2—2 of Fig. 1;

Fig. 3 is a diagrammatic view, partially in elevation and partially in section, of an apparatus employed with the instant invention;

Fig. 4 is a perspective view of a mold board employed with the apparatus of Fig. 3;

Fig. 5 is a sectional view on an enlarged scale taken on the line 5—5 of Fig. 3; and Fig. 6 is an elevational view of a plurality of the mold boards of Fig. 4 in stacked relationship.

Referring now to the drawing, and particularly to Figs. 1 and 2, a sound-absorbing panel or slab 10 is illustrated comprising ground sponge particles 11, asbestos fibres 12, and a binder, preferably of the type of Portland cement, 13. Suitably, the sponge is natural sponge which has been washed and subdivided as by grinding into small particles of a size, say, to pass a ⅜" mesh screen. In lieu of natural sponge, artificial sponge may be employed. As stated, the cementitious material is preferably Portland cement and the description will be directed to a method employing this material as a binder. However, there may be employed other types of binders, such as oxysulphate cement, aluminous cement, silicate of soda, gypsum, and the like.

The sponge particles 11 are present in sufficient amount to comprise a substantial proportion of the bulk of the panel, the cement and asbestos fibre serving, in effect, as a skeletonizing structure, retaining the particles in the panel form. The panel is of high porosity and sound-absorbing efficiency, due to the voids of the sponge particles and those formed by the skeletonized binder structure between the particles. As will be understood by those skilled in the art, the relative proportions of the sponge, fibres, and cement may be varied within limits, depending upon the emphasis desired on any of the particular properties of the sound-absorbing panel. Thus, for example, increasing the proportion of the sponge increases the sound-absorption properties and provides a lighter panel, but at the same time, reduces the strength thereof. Preferably, the several ingredients are employed in proportions within the following limits: sponge 10–24%, asbestos fibre 5–16%, and cement 60–85%. It may be stated, however, for purposes of exemplification that a highly suitable panel has been obtained by employing a mixture comprising by weight ground sponge 13.40%, asbestos fibre 8.85%, and high early strength Portland cement 77.75%.

As will be observed particularly from an examination of Fig. 2, the density of the panel is preferably made somewhat greater adjacent the under-face, that is, the face opposite to the surface 16 which is to be the face of the panel exposed to the sound to be absorbed. By this construction, the greatest porosity is achieved at the exposed face, with the panel progressively becoming denser as the opposite face is approached. Sound-absorbing materials having such characteristics have been found to be particularly effective. The corners of the face 16 may be suitably beveled as illustrated at 14, whereby when the panels are secured to a wall or ceiling surface, as by adhesive, suspension means, or the like, an attractive tiled appearance is presented to the observer.

Panels as described above may be formed by either manual or machine operation. However, a machine operation is preferred and for purposes of exemplification suitable apparatus for this purpose is illustrated in Figs. 3, 4 and 5. The apparatus comprises a mixer 20 of any suitable type which includes paddle members 22 secured to a rotating shaft 24. The ground sponge, fibre, and cementitious material, all in dry form, are deposited in the desired proportions in the mixer 20 and thoroughly mixed and the mix is then discharged through a valve 25 into a bottomless hopper 26 supported above the upper reach 30 of an endless conveyor belt 28. The conveyor is arranged to travel in the direction indicated by the arrows on rolls 34 driven by any suitable means (not shown).

A plurality of mold or caul boards 40 are provided, each comprising a base member 42, longitudinally extending side flanges 44, which may suitably take the form of angle irons, and an end wall or flange 46. The ends of wall 46 are spaced from the side flanges as indicated at 48, a distance slightly greater than the thickness of the material constituting the side walls 36 of hopper 26. Walls or flanges 44 and 46 extend upwardly from the base member 42, a distance equal to the desired thickness of the acoustical panel to be formed.

The mold boards 40 are similarly positioned on the upper reach 30 of the conveyor in end-to-end contiguous relationship, whereby the end wall 46 of one board forms, in effect, an end wall of an adjacent board. The boards are carried by the belt beneath hopper 26. The side walls 36 of hopper 26 extend downwardly to substantially contact the bases 42 of boards 40 and are positioned to pass through the openings 48 between the end wall 46 and side walls 44 of the boards (see Fig. 5). The lower edges of end walls 38 and 39 of hopper 26 are raised sufficiently to clear end wall 46 of the boards as they pass therebeneath, the lower edge of end wall 39 at the rearward end of the hopper being raised an additional distance to permit a thickness of material on the boards somewhat greater than the height of flanges 44 and 46.

Hopper 26 includes a material leveling device 50 comprising pulleys 52 driven from any suitable source of power (not shown), carrying an endless belt 54 traveling in the direction indicated by the arrow. The endless belt carries a plurality of vanes 56 extending the width of hopper 26 and slanting away from the direction of travel of the belt, as illustrated in Fig. 3. Suitably, the leveling device 50 is arranged for adjustment as to height. Rotation of belt 54 about the pulleys 52 causes the vanes 56 to level off the material on the caul boards at a predetermined height and further serves to agitate the material in hopper 26, thus aiding in maintaining the proper intermixture of the several ingredients thereof. The backward slant of vanes 56 prevents any appreciable quantity of the material from being carried by the vanes to the rear of the leveling device.

A smoothing roll 60 may be provided adjacent hopper 26, the smoothing roll being suitably perforated as indicated at 62. Spray heads 64 are located above the travel of conveyor 28 and are arranged to spray water or other wetting medium on the layer of material carried by the mold boards as they pass therebeneath, the boards then passing under a press roll 66.

The dry mix in the hopper 26 fills the caul boards 40 as they pass therebeneath to a depth as determined by leveling device 50. Suitably, the depth of the material is somewhat greater than the height of the flanges 44 and 46 of the caul boards. The loaded boards are then carried beneath smoothing roll 60 and to spray heads 64. The flow of water from the spray heads is controlled to provide a sufficient amount to wet the mix and hydrate the cement without leaving any substantial excess of water. A plurality of the spray heads are preferably used as indicated in the drawing in order that the quantity of water issuing from each head in a given time will not require a spray of such force as would wash any substantial quantity of the cement from the surface of the layer into the interior thereof. After the mixture on the mold boards is wetted, the same is pressed down to some extent by press roll 66, the depth of the material, however, still being preferably somewhat greater than the height of the flanges of the caul boards. The boards are then stacked, as indicated in Fig. 6, and the binder permitted to air cure for a period, say, of three days.

During the air curing, the weight of the stacked boards, a suitable weighting device 70 preferably being employed over the layer on the uppermost board, serves to compress the material thereon to a depth equal to the height of the flanges 44 and 46. In other words, the material is compressed until the bottom of each mold board rests upon the flanges of the one thereneath. After the air curing, the mold boards are separated and the units are transferred to a suitable kiln and the material thoroughly dried at a temperature, say, of 250° F. for approximately 24 hours. After the curing and drying steps, the panels are removed, cut to any suitable dimensions, and preferably beveled as indicated at 14 in Figs. 1 and 2. Thereafter, the panels may be painted or lacquered if desired.

The compressing of the material to a uniform thickness in the manner described above eliminates surface sanding or other similar surface treatments, with consequent simplification of the operation and also with preservation of the preferred natural appearance of the panel. Also, by the described method, the material adjacent the upper face of the layer on the mold board, which is preferably to be the under-face of the finished panel, is compressed to a greater density than the remainder of the layer to provide the increased density in this portion of the panel, previously referred to. The increased density of the block adjacent the under-face is illustrated particularly in Fig. 2. As will be understood, although due to the greater compression adjacent this face there will be a greater concentration of both the sponge and asbestos, at the same time the number and the size of the voids between the particles and the fibres will be decreased with a resultant overall increase in density.

Having thus described our invention in rather full detail, it will be understood that these details need not be strictly adhered to, but that various changes and modifications will suggest themselves to one skilled in the art, all falling within the scope of the invention as defined by the subjoined claims.

What we claim is:

1. A method of making a monolithic sound-absorbing unit comprising dry mixing ground sponge, asbestos fibre, and cement, depositing the mixture in a uniform thickness layer, wetting the deposited mixture to hydrate the cement, slightly compressing the layer, and air curing the cement while maintaining pressure on the layer until the layer assumes a predetermined thickness.

2. A method of making a monolithic sound-absorbing unit comprising dry mixing ground sponge, asbestos fibre, and cement, depositing the mixture in a uniform thickness layer, wetting the deposited mixture with sufficient water to hydrate the cement, slightly compressing the layer, air curing the cement while maintaining pressure on the layer until the layer assumes a predetermined thickness, and then oven drying said layer.

3. A method of making a monolithic sound-absorbing unit comprising dry mixing ground sponge, asbestos fibre, and Portland cement, depositing the mixture in a uniform thickness layer, wetting the deposited mixture with sufficient water to hydrate the cement without the presence of a substantial excess of water and in a manner to prevent substantial washing of the cement from a surface of the layer, air curing the cement while maintaining pressure on the layer until the layer assumes a predetermined thickness, and then oven drying the layer.

4. A method of making a monolithic sound-absorbing unit comprising dry mixing ground sponge, asbestos fibre, and Portland cement in proportions of the order of sponge 13.40%, asbestos fibre 8.85%, and cement 77.75%, depositing the mixture in a uniform thickness layer, wetting the deposited mixture, slightly compressing the layer, air curing the cement while maintaining pressure on the layer until the layer assumes a predetermined thickness, and then oven drying said layer.

5. A method of making a monolithic sound-absorbing unit comprising dry mixing ground sponge, asbestos fibre, and Portland cement in proportions of the order of sponge 10–24%, asbestos fibre 5–16%, and cement 60–85%, depositing the mixture in a uniform thickness layer, wetting the deposited mixture with a sufficient amount of water to hydrate the cement without the presence of a substantial excess of water, slightly compressing the layer, air curing the cement while maintaining pressure on the layer until the layer assumes a predetermined thickness, and then oven drying said layer.

6. A method of making a monolithic sound-absorbing unit comprising dry mixing ground sponge, asbestos fibre, and cement, depositing the mixture in a uniform thickness layer, wetting the deposited mixture, applying pressure to the layer at one surface thereof, and air curing the cement while maintaining pressure on said surface to cause the layer to assume a predetermined thickness.

7. A method of making a monolithic sound-absorbing unit comprising dry mixing ground sponge, asbestos fibre, and cement, depositing the mixture in a uniform thickness layer on a mold board including thickness gauging means, leveling the deposited mixture to form a layer of a depth greater than the height of the thickness gauging means, wetting the deposited mixture, slightly compressing the layer, air curing the cement while maintaining pressure on the layer until the same assumes a thickness determined by said thickness gauging means, and then oven drying said layer.

GEORGE B. BROWN.
OSBORN AYERS